United States Patent
Chung et al.

(10) Patent No.: US 12,510,902 B2
(45) Date of Patent: Dec. 30, 2025

(54) UNMANNED AERIAL VEHICLE FOR DELIVERING GOODS USING DROP ZONE, OPERATING METHOD THEREOF AND COMPUTER READABLE STORAGE MEDIUM

(71) Applicants: Hyundai Motor Company, Seoul (KR); KIA CORPORATION, Seoul (KR)

(72) Inventors: Jae Hoon Chung, Seoul (KR); Kye Yoon Kim, Gunpo-Si (KR)

( * ) Notice: Subject to any disclaimer, the term of this patent is extended or adjusted under 35 U.S.C. 154(b) by 0 days.

(21) Appl. No.: 18/220,486

(22) Filed: Jul. 11, 2023

(65) Prior Publication Data
US 2024/0248476 A1 Jul. 25, 2024

(30) Foreign Application Priority Data
Jan. 20, 2023 (KR) .................. 10-2023-0008956

(51) Int. Cl.
| | | |
|---|---|---|
| B64D 1/12 | (2006.01) | |
| B64U 101/64 | (2023.01) | |
| G05D 1/00 | (2006.01) | |
| B64U 101/69 | (2023.01) | |

(52) U.S. Cl.
CPC ............ G05D 1/1064 (2019.05); B64D 1/12 (2013.01); G05D 1/042 (2013.01); *B64U 2101/64* (2023.01); *B64U 2101/69* (2023.01); *B64U 2201/10* (2023.01)

(58) Field of Classification Search
CPC .. B64U 2101/64; B64U 2101/60; B64D 1/02; B64D 1/12
See application file for complete search history.

(56) References Cited

U.S. PATENT DOCUMENTS

| | | | |
|---|---|---|---|
| 9,387,928 B1 | 7/2016 | Gentry et al. | |
| 9,975,651 B1* | 5/2018 | Eck | B64F 1/32 |
| 10,647,508 B2* | 5/2020 | Eck | B64F 1/368 |
| 11,213,156 B2 | 1/2022 | Morris | |
| 12,205,072 B1* | 1/2025 | Mohammed | G05D 1/0212 |
| 2016/0068264 A1* | 3/2016 | Ganesh | G06Q 30/0641 |
| | | | 701/4 |
| 2016/0185466 A1 | 6/2016 | Dreano, Jr. | |

(Continued)

FOREIGN PATENT DOCUMENTS

| | | |
|---|---|---|
| CN | 107451788 A | 12/2017 |
| JP | 2022-113183 A | 8/2022 |

(Continued)

OTHER PUBLICATIONS

Mar. 22, 2024—Extended EP Search Report—App 23199670.3.

*Primary Examiner* — Timothy D Collins
*Assistant Examiner* — Terri L Filosi
(74) *Attorney, Agent, or Firm* — Banner & Witcoff, Ltd.

(57) ABSTRACT

An unmanned aerial vehicle includes: a drive configured to accelerate the unmanned aerial vehicle; a carrying part configured to carry goods; a communication unit; one or more processors; and memory storing instructions that, when executed by the one or more processors, cause the unmanned aerial vehicle to enter a standby space associated with a drop zone, transmit a drop permission request, enter a drop space above the drop zone when drop permission is received, and drop the goods into the drop zone by controlling the carrying part.

20 Claims, 8 Drawing Sheets

(56) References Cited

U.S. PATENT DOCUMENTS

| | | | |
|---|---|---|---|
| 2017/0032315 A1 | 2/2017 | Gupta et al. | |
| 2019/0130770 A1 | 5/2019 | Di Benedetto et al. | |
| 2019/0133363 A1* | 5/2019 | Burchat | A47G 29/141 |
| 2019/0302249 A1* | 10/2019 | High | G01S 5/02 |
| 2020/0198801 A1* | 6/2020 | Carthew | B64U 70/30 |
| 2021/0284451 A1* | 9/2021 | Burchat | B65G 11/203 |
| 2022/0388682 A1* | 12/2022 | Hurst | E04B 7/16 |
| 2025/0004485 A1* | 1/2025 | Oshima | B61B 12/00 |

FOREIGN PATENT DOCUMENTS

| | | |
|---|---|---|
| KR | 102228277 B1 | 3/2021 |
| KR | 102455360 B1 | 10/2022 |
| WO | 2016/037219 A1 | 3/2016 |
| WO | 2018-199460 A1 | 11/2018 |

\* cited by examiner

UNMANNED AERIAL VEHICLE FOR DELIVERING GOODS USING DROP ZONE, OPERATING METHOD THEREOF AND COMPUTER READABLE STORAGE MEDIUM

CROSS-REFERENCE TO RELATED APPLICATION (S)

This application claims benefit of priority to Korean Patent Application No. 10-2023-0008956, filed on Jan. 20, 2023, in the Korean Intellectual Property Office, the disclosure of which is incorporated herein by reference in its entirety.

BACKGROUND

1. Field

The present disclosure relates to an unmanned aerial vehicle for delivering goods using a drop box, an operating method thereof, and a computer readable storage medium.

2. Description of Related Art

Recently, research and development of the delivery of goods using unmanned aerial vehicles such as drones have been conducted. There is a need for the development of a system for delivering goods directly to an elevated location such as the rooftop of a high-rise building using such unmanned aerial vehicles. Furthermore, in the instant case, it is necessary to prevent collisions among unmanned aerial vehicles that deliver the goods.

SUMMARY

An aspect of the present disclosure is to provide an unmanned aerial vehicle for delivering goods directly to a high location, such as a rooftop of a high-rise building, and delivering the goods using a drop zone (e.g., a drop box) to prevent collisions between unmanned aerial vehicles, an operating method thereof, and a computer readable storage medium.

According to one or more embodiments of the present disclosure, an unmanned aerial vehicle may include: a drive configured to accelerate the unmanned aerial vehicle; a carrying part configured to carry goods; a communication interface; one or more processors; and memory storing instructions that, when executed by the one or more processors, cause the unmanned aerial vehicle to: enter, using the drive, a standby space associated with a drop zone; transmit, based on entering the standby space and via the communication interface, a drop permission request; based on receiving, via the communication interface, a drop permission, enter, using the drive, a drop space above the drop zone; and based on entering the drop space, drop the goods into the drop zone by controlling the carrying part.

The drop zone may include an upper opening, a lower opening, and an inclined surface connecting the upper opening to the lower opening. The drop space may include a space extending, by a first length, upward from the upper opening of the drop zone, and exclude a space directly above the lower opening of the drop zone. The standby space may include a space formed by extending, by a second length, from a side surface of the drop space to surround the side surface of the drop space.

After the goods are dropped to the inclined surface of the drop zone, the goods may be moved to the lower opening by gravity on the inclined surface.

The inclined surface may have a spiral guide having a preset height formed thereon to reduce a moving speed of the dropped goods. The spiral guide may have a curved surface in contact with the goods.

The standby space may include: a plurality of sub-standby spaces, and a plurality of buffer spaces provided between each of the plurality of the sub-standby spaces to prevent collision between the unmanned aerial vehicle and an adjacent unmanned aerial vehicle.

The instructions, when executed by the one or more processors, may cause the unmanned aerial vehicle to enter the standby space by entering an empty sub-standby space, of the plurality of sub-standby spaces, having a maximum distance from the adjacent unmanned aerial vehicle.

Light emitting diodes (LEDs) of different colors may be provided at an edge of the upper opening of the drop zone corresponding to the plurality of sub-standby spaces.

The instructions, when executed by the one or more processors, may cause the unmanned aerial vehicle to, based on completing dropping the goods into the drop zone, exit the drop space by flying up vertically.

The instructions, when executed by the one or more processors, may further cause the unmanned aerial vehicle to transmit, based on completing dropping the goods into the drop zone and via the communication interface, a drop completion notification.

The instructions, when executed by the one or more processors, may further cause the unmanned aerial vehicle to receive, via the communication interface, the drop permission after a previous unmanned aerial vehicle transmits a drop completion notification.

The instructions, when executed by the one or more processors, may further cause the unmanned aerial vehicle to: transmit, before entering the standby space and via the communication interface, an emergency drop request; and, based on receiving the drop permission, enter, using the drive, the drop space without waiting in the standby space.

The instructions, when executed by the one or more processors, may cause the unmanned aerial vehicle to transmit the emergency drop request based on at least one of: a weight of the goods exceeding a threshold weight, a state of charge of a battery associated with the unmanned aerial vehicle being less than a threshold state of charge, or the goods comprising emergency goods.

According to one or more embodiments of the present disclosure, a method may include: entering, by an unmanned aerial vehicle, a standby space associated with a drop zone; transmitting, based on entering the standby space, a drop permission request; based on receiving a drop permission, entering a drop space above the drop zone; and based on entering the drop space, dropping goods into the drop zone.

The drop zone may include an upper opening, a lower opening, and an inclined surface connecting the upper opening to the lower opening. The drop space may include a space formed by extending, by a first length, upward from the upper opening of the drop zone, and exclude a space directly above the lower opening of the drop zone. The standby space may include a space formed by extending, by a second length, from a side surface of the drop space to surround the side surface of the drop space.

The standby space may include: a plurality of sub-standby spaces, and a plurality of buffer spaces provided between each of the plurality of the sub-standby spaces to prevent collisions between the unmanned aerial vehicle and an adjacent unmanned aerial vehicle.

Entering of the standby space may include entering an empty sub-standby space, of the plurality of sub-standby spaces, having a maximum distance from the adjacent unmanned aerial vehicle.

The method may further include, based on completing the dropping of the goods, exiting the drop space by flying up vertically.

The method may further include transmitting, based on completing the dropping of the goods, a drop completion notification.

The method may further include: transmitting, before the entering of the standby space, an emergency drop request; and based on the receiving of the drop permission, entering the drop space without waiting in the standby space.

According to one or more embodiments of the present disclosure, a non-transitory computer-readable storage medium may store instructions that, when executed by one or more processors, cause an unmanned aerial vehicle to: enter a standby space associated with a drop zone; transmit, based on entering the standby space, a drop permission request; based on receiving a drop permission, enter a drop space above the drop zone; and based on entering the drop space, drop goods into the drop zone.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
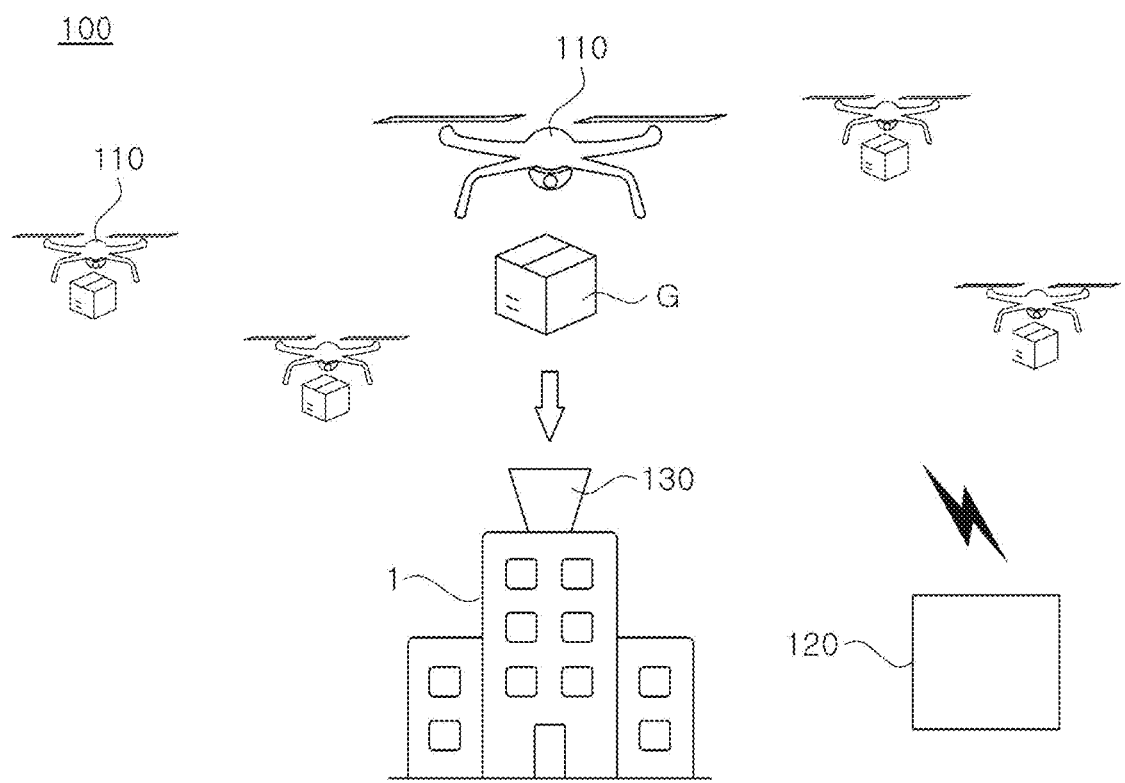
FIG. 1 is a view illustrating a system for delivering goods using a drop zone.

Hereinafter, the present disclosure will be described with reference to specific example embodiments and the attached drawings. The embodiments of the present disclosure may, however, be exemplified in many different forms and should not be construed as being limited to the specific embodiments set forth herein. The example embodiments disclosed herein are provided for those skilled in the art to better explain the present disclosure. In the drawings, the shapes and dimensions of elements may be exaggerated for clarity, and the same reference numerals will be used throughout to designate the same or like elements.

FIG. 1 is a view illustrating a system for delivering goods using a drop zone.

As illustrated in FIG. 1, a system 100 for delivering goods using a drop zone may include an unmanned aerial vehicle (UAV) 110, a control server 120, and a drop zone (e.g., a drop box) 130.

In the present disclosure, the unmanned aerial vehicle (UAV) 110 refers to an aerial vehicle configured to fly automatically or semi-automatically according to a pre-programmed path without a pilot directly boarding. The unmanned aerial vehicle 110 may fly in a state in which goods G are fixed, and may drop the goods into the drop zone 130 provided on a rooftop of a building 1. Meanwhile, the control server 120 may manage the delivery of the goods through communication with the unmanned aerial vehicle 110.

Furthermore, in the present disclosure, the term "goods" refers to a type of objects that may be mounted in the unmanned aerial vehicle 110 and has a certain volume and weight to deliver a product to a customer.

Hereinafter, the unmanned aerial vehicle 110, the control server 120, and the drop zone 130 will be further described with reference to FIGS. 2 to 5.

Figure 2:
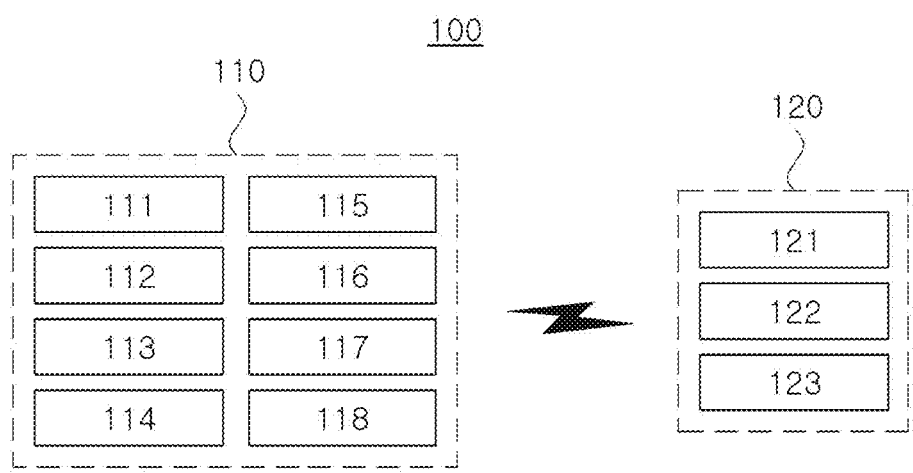
FIG. 2 is a view illustrating an internal block diagram of an unmanned aerial vehicle and a control server.
Figure 3:
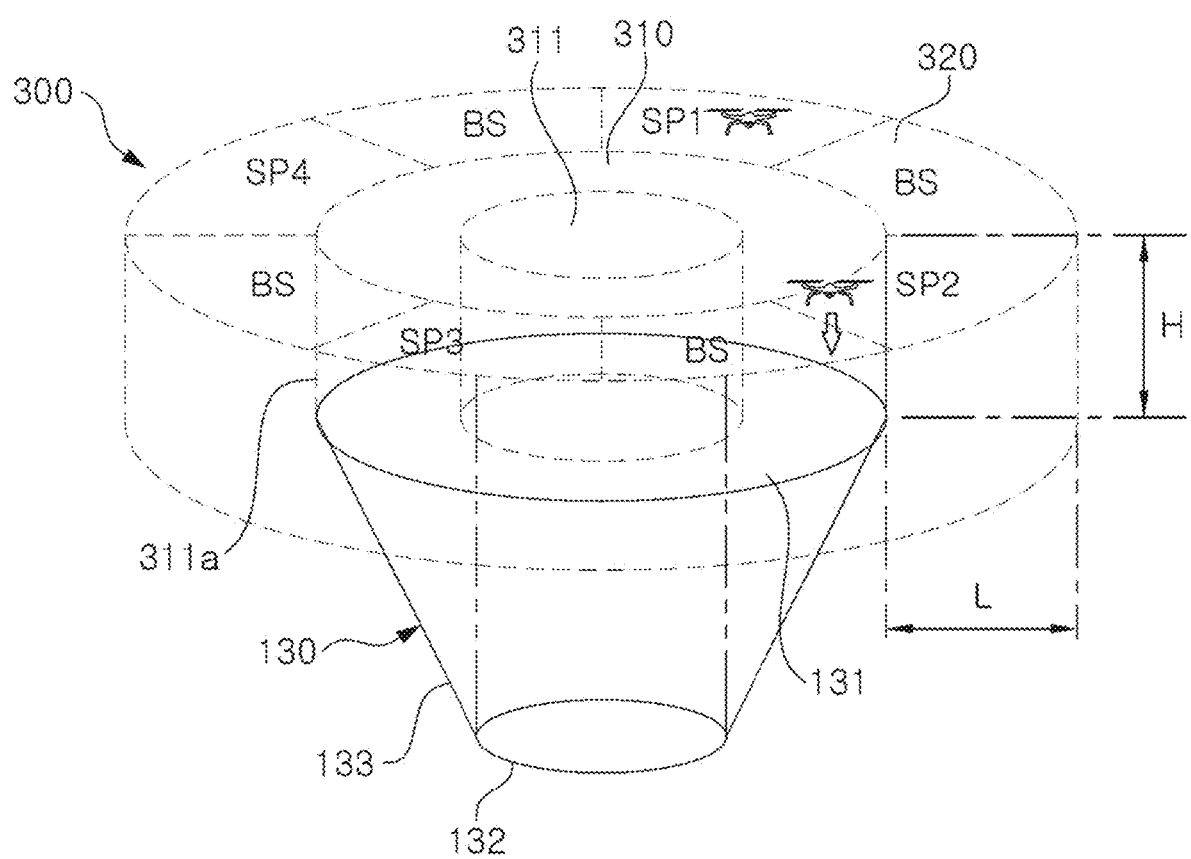
FIG. 3 is a perspective view of a drop zone, a standby space, and a drop space.
Figure 4:
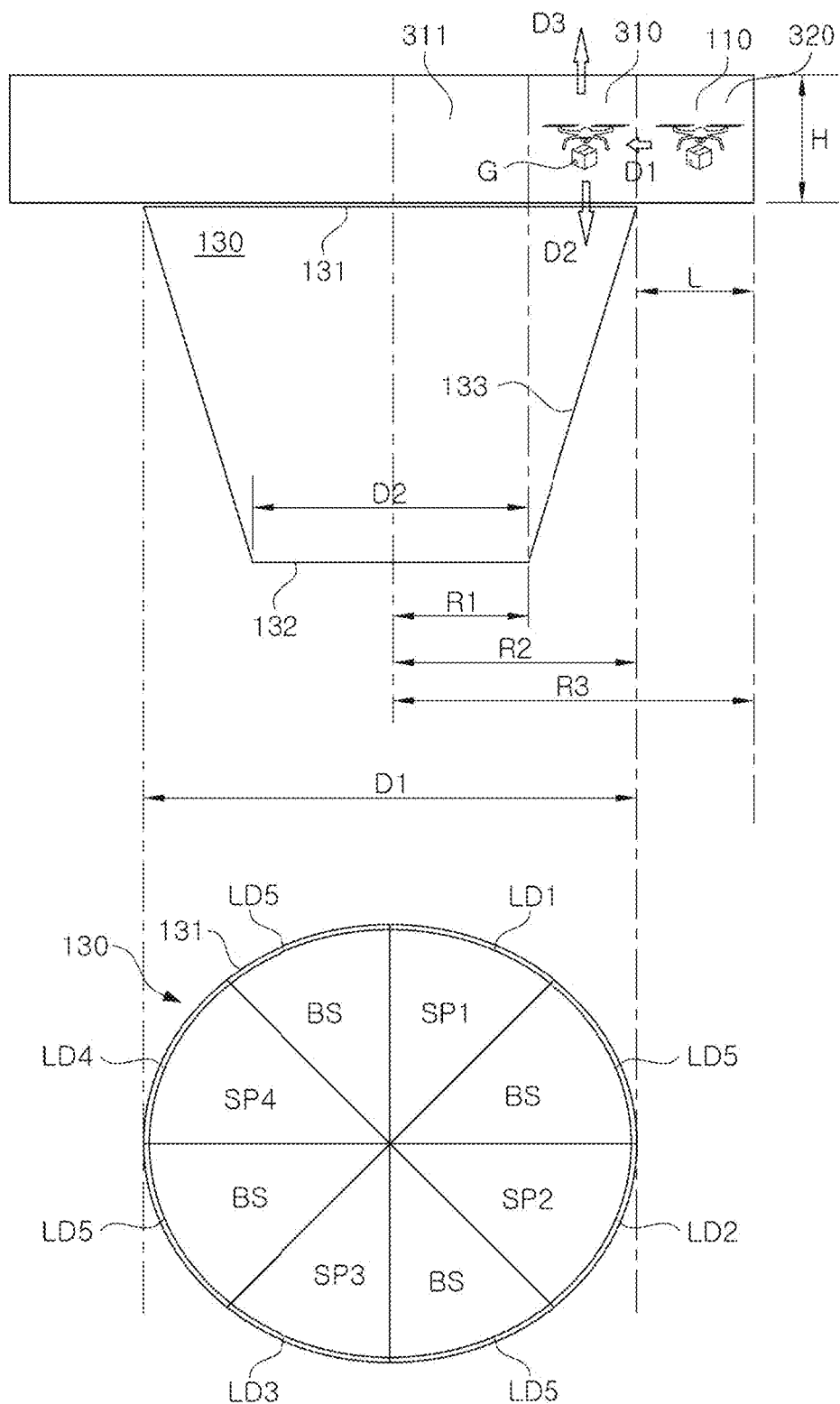
FIG. 4 is a view illustrating the drop zone, the standby space, and the drop space when viewed from a side surface (see upper portion), and a view illustrating the drop zone when viewed from above (see lower portion)
Figure 5:
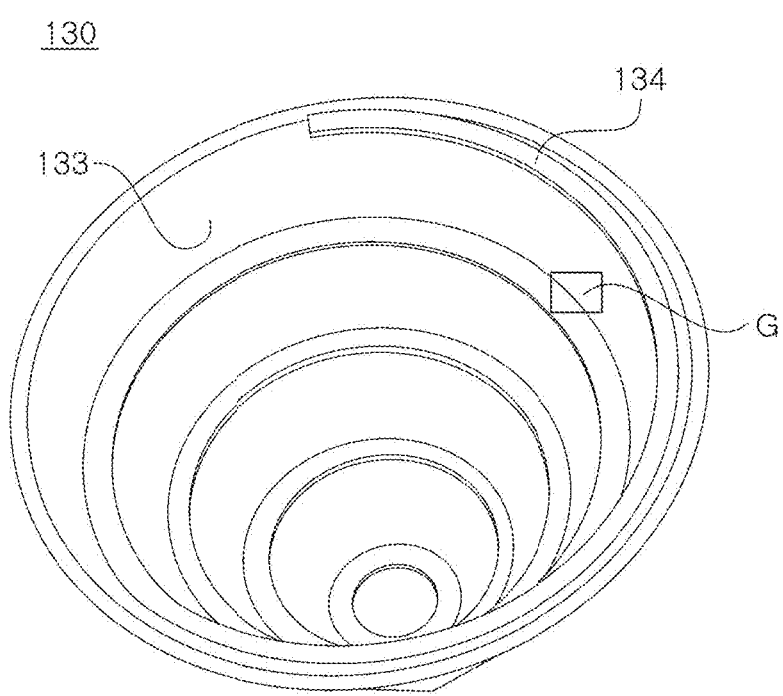
FIG. 5 is a perspective view illustrating the drop zone.

FIG. 2 is a view illustrating an internal block diagram of an unmanned aerial vehicle and a control server. Meanwhile, FIG. 3 is a perspective view of a drop zone, a standby space, and a drop space, and FIG. 4 is a view illustrating the drop zone, the standby space, and the drop space when viewed from a side surface (see upper portion), and a view illustrating the drop zone when viewed from above (see lower portion). Furthermore, FIG. 5 is a perspective view illustrating the drop zone.

As illustrated in FIG. 2, the unmanned aerial vehicle 110 may include a drive 111, a carrying part 112, a battery 113, an image sensor 114, a location information acquisition device 115, a controller 116, storage 117, and a communication interface 118. Furthermore, the control server 120 may include a controller 121, a communication interface 122, and storage 123.

The controller 116 and the controller 121 may include a processor (e.g., computer, microprocessor, central processing unit (CPU), application-specific integrated circuit (ASIC), circuitry, logic circuits, etc.) and an associated non-transitory memory storing software instructions which, when executed by the processor, provides the functionalities of the controller 116 and the controller 121 as described here. Herein, the memory and the processor may be implemented as separate semiconductor circuits. Alternatively, the memory and the processor may be implemented as a single integrated semiconductor circuit. The processor may embody one or more processor (s).

Specifically, the drive 111 of the unmanned aerial vehicle 110 is a device for moving, propelling, accelerating, and/or controlling a flight of the unmanned aerial vehicle 110 to fly along a preset flight path, and may include, for example, a propeller, a propulsion device, an engine, and/or a driving motor.

The carrying part 112 (also referred to as a fixing unit, a goods hold, storage, etc.) of the unmanned aerial vehicle 110 may be a device for attaching or mounting goods G to the unmanned aerial vehicle 100, and also for deploying (e.g., dropping, releasing, de-attaching, etc.) the goods G downward by releasing attachment of the goods G under the control of the controller 116 described below. The carrying part 112 may be, for example, a clasp, a clamp, a strap, a claw, a hook, an arm, a hatch, a chute, or the like.

The battery 113 of the unmanned aerial vehicle 110 may be a device for supplying power to each internal components such as the driver 111 and the like, and various types of batteries such as a lithium ion battery and a solid state battery may be used as the battery 113.

The image sensor 114 of the unmanned aerial vehicle 110 may be a device for capturing a 3D image, and may be, for example, a camera such as a 3D camera. The acquired 3D image may be transmitted to the controller 116 described below.

The location information acquisition device 115 of the unmanned aerial vehicle 110 may be a device for acquiring global positioning system (GPS) information and altitude information of the unmanned aerial vehicle 110, and the acquired GPS information and altitude information may be transmitted to the controller 116 described below.

The controller 116 of the unmanned aerial vehicle 110 may control the driver 111 based on the GPS information, the altitude information, and the 3D image as described above.

Specifically, the controller 116 may control the driver 111 so that the unmanned aerial vehicle 110 enters the standby space on an upper portion of (e.g., above) the drop zone 130 provided on the rooftop of the building 1, and may control the communication interface 118 to transmit a drop permission request (e.g., a drop permission request message) if the entry into the standby space is completed. The drop zone 130 may be an area or space that is designated for reception of goods via gravity-based aerial deployment. For example, the drop zone 130 may be a marked or unmarked area, such as a box, a receptacle, a basket, a chute, a rooftop, a porch, a yard, etc.

Furthermore, if drop permission (e.g., a drop permission message) is received in response to the drop permission request, the controller 116 may control the driver 111 so that the unmanned aerial vehicle 110 enters the drop space on the upper portion of (e.g., above) the drop zone 130, and may control (e.g., release) the carrying part 112 so that the goods may be dropped into the drop zone 130 if the entry into the drop space is completed.

Hereinafter, with reference to FIGS. 3 to 5, the standby space, the drop space, and the drop zone will be described.

The standby space and the drop space may be set (e.g., designated) in an upper portion 300 of the drop zone 130.

Here, a drop space 310 may be a space for the unmanned aerial vehicle 110 to drop the goods G into the drop zone 130. Specifically, the drop space 310 may be a space formed by extending upward from (e.g., directly above) the upper opening 131 of the drop zone 130 by a preset length H, and may be a space excluding a space 311 formed by extending upward from (e.g., directly above) a lower opening 132 of the drop zone 130. The above-described preset length H may be set to an appropriate length in order to prevent damage to the goods G due to collisions with an inclined surface 133 when dropping the goods G, which may vary depending on a packaging state of the goods G, and a material of the inclined surface. It should be noted that in the present disclosure, the preset length H is not limited to a specific value.

A waiting space 320 (also referred to as a "standby space") may be a space in which the unmanned aerial vehicle 110 waits for delivery of goods (e.g., prior to moving into the drop space 310 for deployment of the goods). Specifically, the standby space 320 may be a space extending by the preset length L from a side surface 311a of the drop space 310 to surround the side surface 311a of the drop space 310. It should be noted that because the above-described preset length L may vary depending on the size of the unmanned aerial vehicle 110, it is not limited to a specific value in the present disclosure. The standby space 320 may be at a higher elevation than the upper opening 131 of the drop zone 130.

Furthermore, the standby space 320 may be made up of a plurality of sub-standby spaces SP1 to SP4 which the unmanned aerial vehicle 110 enters and a plurality of buffer spaces BS provided between each of the plurality of sub-standby spaces SP1 to SP4 to prevent collisions with adjacent unmanned aerial vehicles.

Meanwhile, the drop zone 130 may be a device for receiving the goods G dropped from the unmanned aerial vehicle 110. Specifically, the drop zone 130 (e.g., the funnel-shaped drop zone 130 as shown in FIG. 3) may have a funnel shape (e.g., a conical frustum as shown in FIGS. 3-5) including an upper opening 131, a lower opening 132, and an inclined surface 133 (e.g., a slanted side surface of a conical frustum as shown in FIGS. 3-4) having a preset angle formed between the upper opening 131 and the lower opening 132. Because a specific value of an angle of the inclined surface 133 may be appropriately set according to the needs of those skilled in the art, the angle thereof is not limited to a specific value in the present disclosure. Furthermore, the angle of the inclined surface 133 may be changed under the control of the control server 120, and to this end, an appropriate means may be provided to adjust the angle.

As illustrated in FIG. 4, a diameter D1 of the upper opening 131 is larger than a diameter D1 of the lower opening 132, and Reference Numeral R1 indicates a radius of the lower opening 132, Reference Numeral R2 indicates a radius of the upper opening 131, and Reference Numeral R3 indicates a distance from a center O of the openings 131 and 132 to an external side of the standby space 320.

Furthermore, as illustrated in FIG. 5, a spiral guide 134 having a preset height to reduce a moving speed of the dropped goods G may be formed on the inclined surface 133 of the drop zone 130. Furthermore, the spiral guide 134 may have a curved surface with which the goods G is in contact, thus moving the goods G within the spiral guide 134 without any separation. The goods G may be dropped to the inclined surface 133 of the drop zone 130 and then moved to the lower opening 132 by gravity on the inclined surface 133.

Furthermore, as illustrated in lower portion of FIG. 4, light emitting diodes (LED) LD1 to LD5 may be provided at an edge of the upper opening 131 of the drop zone 130. Specifically, the LEDs LD1 to LD4 of different colors may be provided at the edge of the upper opening of the drop zone 130 corresponding to a plurality of sub-standby spaces SP1 to SP4. Furthermore, an LED LD5 of the same color may be provided at an edge of the upper opening of the drop zone 130 corresponding to the plurality of buffer spaces BS.

Meanwhile, the controller 116 may control the driver 111 so that the unmanned aerial vehicle 110 may enter a sub-standby space without another unmanned aerial vehicle 110 among the plurality of sub-standby spaces SP1 to SP4, but may enter a sub-standby space having a maximum distance from an adjacent unmanned aerial vehicle.

For example, as illustrated in FIG. 3 or the lower portion of FIG. 4, if there is an unmanned aerial vehicle waiting in the first sub-standby space SP1 among the plurality of sub-standby spaces SP1 to SP4, the controller 116 may control the driver 111 so that the unmanned aerial vehicle 110 may enter an identified sub-standby space having a maximum distance from the adjacent unmanned aerial vehicle, that is, the identified third sub-standby space SP3. If another unmanned aerial vehicle exists in the third sub-standby space SP3, the controller 116 may control the driver 111 so that the unmanned aerial vehicle 110 may enter either the identified second sub-standby space SP2 or the identified fourth sub-standby space SP4.

Furthermore, if the drop of the goods G is completed, the controller 116 may control the driver 111 so that the unmanned aerial vehicle 110 may fly up vertically to escape (e.g., exit) from the drop space 310.

For example, as illustrated in upper portion of FIG. 4, the unmanned aerial vehicle 110 waiting in the standby space 320 may enter the drop space 310 by flying horizontally (see part D1), and after the entry is completed, the goods G may be dropped to the inclined surface 133 of the drop zone 130 (see part D2), and then, the unmanned aerial vehicle 110 may fly vertically to escape from the drop space 310 (see part D3).

Furthermore, if the drop of the goods G is completed, the controller 116 may control the communication interface 118 to be described below to transmit a drop completion notification to the control server 120. After the drop completion notification is transmitted, the unmanned aerial vehicle in a subsequent order may receive drop permission in the order in which the drop permission request is transmitted.

Meanwhile, the controller 116 may control the communication interface 118 described below to transmit an emergency drop request before the unmanned aerial vehicle 110 enters the standby space 320, and may control the driver 111 so that the unmanned aerial vehicle 110 directly enters the drop space 310 if the drop permission is received in response to the emergency drop request. Then, if the entry into the drop space 310 is completed, the controller 116 may control the carrying part 112 to drop the goods G into the drop zone 130.

For example, the emergency drop request may be a request including any one of a case in which a weight of the goods G exceeds a preset weight (e.g., a threshold weight), a case in which a remaining capacity (e.g., a state of charge) of the battery 113 is less than a preset remaining capacity (e.g., a threshold state of charge), and a case in which the goods G are emergency goods.

The storage 117 of the unmanned aerial vehicle 110 may be a device for storing various programs and/or computer-readable instructions for implementing functions performed by the controller 116 described above.

The communication interface 118 of the unmanned aerial vehicle 110 may be a device for transmitting or receiving various data to or from the control server 120. The communication interface 118 may be capable of communication using, for example, cellular communication (e.g., Global System for Mobile communications (GSM), General Packet Radio Service (GPRS), ***Code Division Multiple Access (CDMA) data channel or data carrying mechanism, an Enhanced Data Rates for GSM Evolution (EDGE) or Enhanced GPRS (EGPRS) data channel, an Evolution-Data Optimized or Evolution-Data only (EV-DO or EVDO) data channel, a Universal Mobile Telecommunications System (UMTS) data channel, any type of Internet Protocol (IP) based wireless protocol, a cellular control channel, etc.).

Meanwhile, the controller 121 of the control server 120 manages the delivery of the goods.

Specifically, when receiving the drop permission request from the unmanned aerial vehicle 110, the controller 121 may determine whether a drop completion notification has been received from a previous unmanned aerial vehicle. As a result of the determination, if the drop completion notification is received from the previous unmanned aerial vehicle, the controller 121 determines whether the unmanned aerial vehicle 110 is next in order (e.g., next in queue) for deployment (e.g., dropping goods). As a result of the determination, if the unmanned aerial vehicle 110 is next in order, the drop permission may be transmitted to the unmanned aerial vehicle 110. Then, upon receiving the drop completion notification from the unmanned aerial vehicle 110, drop permission may be transmitted to a next unmanned aerial vehicle.

Furthermore, if the controller 121 receives the emergency drop request from the unmanned aerial vehicle 110, it determines whether the drop completion notification has been received from the previous unmanned aerial vehicle. As a result of the determination, if the drop completion notification is received from the previous unmanned aerial vehicle, the drop permission may be transmitted to the unmanned aerial vehicle 110. Then, upon receiving the drop completion notification from the unmanned aerial vehicle 110, another drop permission may be transmitted to a next unmanned aerial vehicle.

Meanwhile, the communication interface 122 of the control server 120 may be a device for transmitting or receiving various data to or from the unmanned aerial vehicle 110.

In addition, the storage 123 of the control server 120 may be a device for storing various programs for implementing functions performed by the controller 121 described above. Furthermore, the storage 123 may store the order of the unmanned aerial vehicle in which the drop permission request has been received.

As described above, the upper space of the drop zone provided on the rooftop of the building and receiving the goods may be set as a standby space in which the unmanned aerial vehicle may wait and a drop space in which the goods G may be dropped. If the drop permission is received from the delivery management server, the unmanned aerial vehicle 110 may enter the drop space from the standby space and drop the goods into the drop zone, thereby delivering the goods directly to a high location such as a rooftop of a high-rise building and preventing the collisions between the unmanned aerial vehicles.

Figure 6:
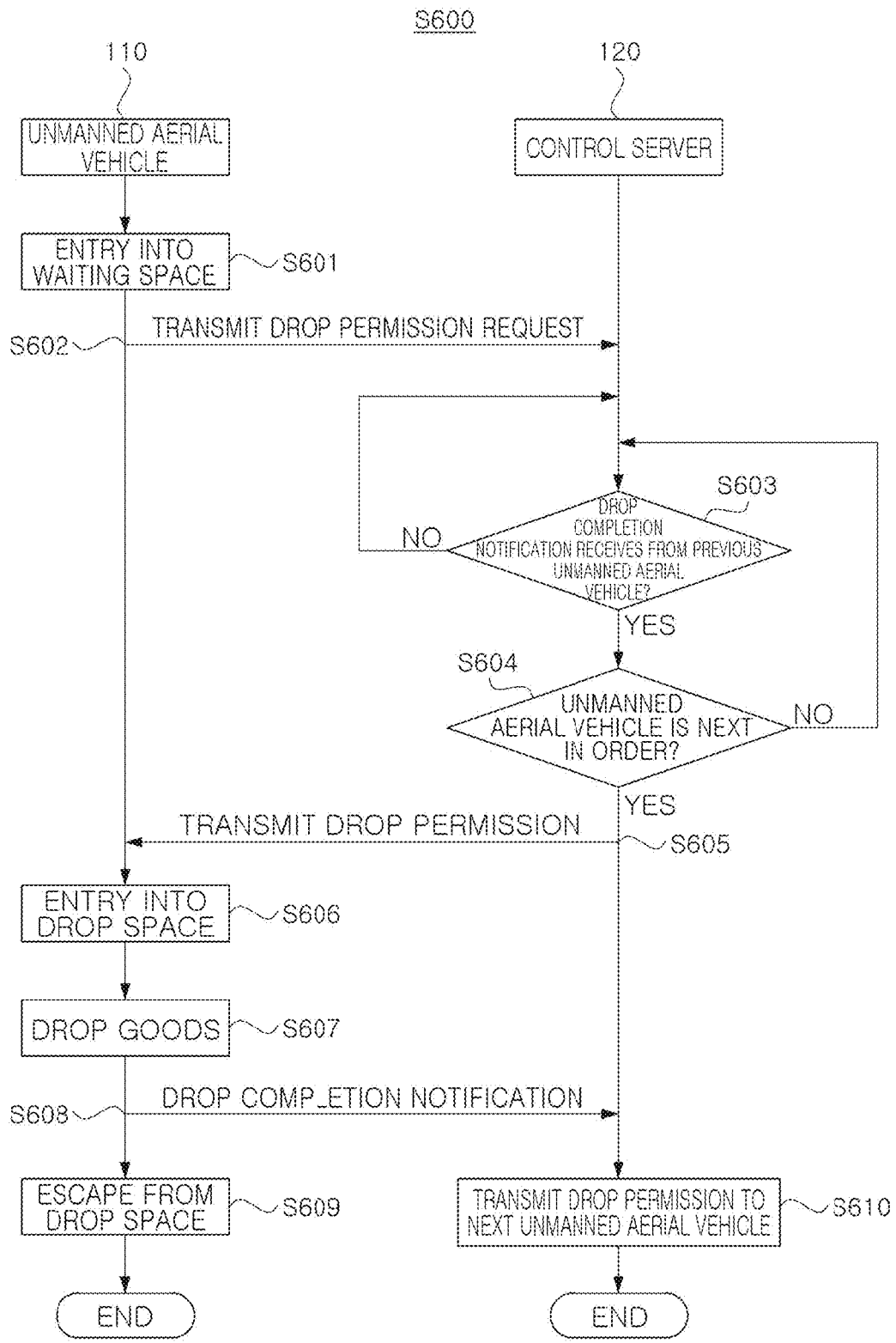
FIG. 6 is a flowchart illustrating a method for delivering goods using a drop zone.

Hereinafter, FIG. 6 is a flowchart illustrating a method for delivering goods using a drop zone. For simplification of the invention, descriptions overlapping those described in FIGS. 1 to 5 will be omitted.

Referring to FIGS. 1 to 6, a method for delivering goods using a drop zone (S600) may be initiated by an operation in which the unmanned aerial vehicle 110 enters the standby space (S601).

The unmanned aerial vehicle 110 may enter a sub-standby space without another unmanned aerial vehicle among the plurality of sub-standby spaces SP1 to SP4, but may enter a sub-standby space having a maximum distance from an adjacent unmanned aerial vehicle.

If the entry into the standby space is completed, the unmanned aerial vehicle 110 may transmit a drop permission request to the control server 120 (S602).

Upon receiving the drop permission request, the control server 120 determines whether a drop completion notification has been received from a previous unmanned aerial vehicle (S603). As a result of the determination, if the drop completion notification is received from the previous unmanned aerial vehicle, the control server 120 determines whether the unmanned aerial vehicle 110 is next in order (S604).

As a result of the determination, if the unmanned aerial vehicle 110 is next in order, drop permission may be transmitted to the unmanned aerial vehicle 110 (S605). On the other hand, as a result of the determination, if the unmanned aerial vehicle 110 is not next in order, the process may return to operation S603.

Then, the unmanned aerial vehicle 110 receiving the drop permission may enter the drop space on the upper portion of the drop zone 130 (S606), and if the entry into the drop space is completed, the goods may be dropped into the drop zone 130 (S607).

Then, after transmitting the drop completion notification to the control server 120 (S608), the unmanned aerial vehicle 110 may vertically fly to escape from the drop space 310 (S609).

Meanwhile, the control server 120 receiving the drop completion notification may transmit the drop permission to a next unmanned aerial vehicle (S610).

The drop space 310 may be a space for the unmanned aerial vehicle 110 to drop the goods G into the drop zone 130. Specifically, as described above, the drop space 310 may be a space formed by extending upward from the upper opening 131 of the drop zone 130 by a preset (e.g., predetermined) length H, and may be a space excluding a space 311 formed by extending upward from the lower opening 132 of the drop zone 130.

Furthermore, the standby space 320 may be a space in which the unmanned aerial vehicle 110 waits for delivery of goods. Specifically, as described above, the standby space 320 may be a space extending by a present length L from a side surface 311*a* of the drop space 310 to surround the side surface 311*a* of the drop space 310.

Furthermore, as described above, the standby space 320 may be made up of the plurality of sub-standby spaces SP1 to SP4 which unmanned aerial vehicle 110 enters and the plurality of buffer spaces BS provided between each of the plurality of sub-standby spaces SP1 to SP4 to prevent the collisions with the adjacent unmanned aerial vehicles.

Furthermore, the drop zone 130 may be a device for receiving the goods G dropped from the unmanned aerial vehicle 110. Specifically, as described above, the drop zone 130 may have the funnel shape (e.g., a conical frustum as shown in FIGS. 3-5) including the upper opening 131, the lower opening 132, and the inclined surface 133 (e.g., a slanted side surface of a conical frustum as shown in FIGS. 3-4) having a preset angle formed between the upper opening 131 and the lower opening 132.

Figure 7:
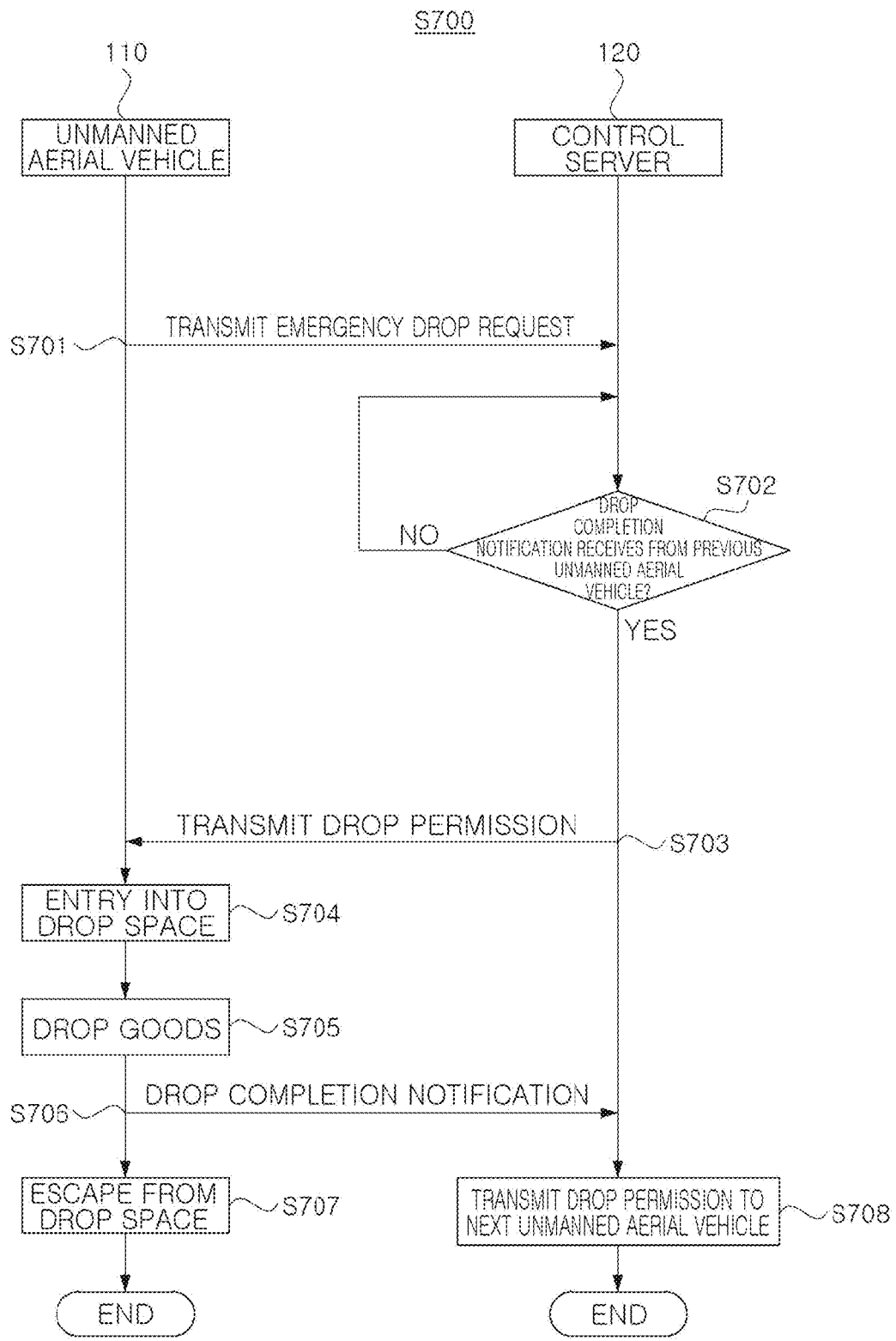
FIG. 7 is a flowchart illustrating a method for delivering goods using a drop zone, which belongs to a case in which an emergency drop request occurs.

Meanwhile, FIG. 7 is a flowchart illustrating a method for delivering goods using a drop zone, which belongs to a case in which an emergency drop request occurs.

Referring to FIGS. 1 to 5 and 7, a method for delivering goods using a drop zone (S600) may be initiated by an operation in which the unmanned aerial vehicle 110 transmits an emergency drop request to the control server 120 (S701).

The control server 120 receiving the emergency drop request may determine whether a drop completion notification has been received from the previous unmanned aerial vehicle (S702).

As a result of the determination, if the drop completion notification is received from the previous unmanned aerial vehicle, the control server 120 may transmit drop permission to the unmanned aerial vehicle 110 (S703).

Then, the unmanned aerial vehicle 110 receiving the drop permission may enter the drop space on the upper portion of the drop zone 130 (S704), and if the entry into the drop space is completed, the goods may be dropped into the drop zone 130 (S705).

Then, after transmitting the drop completion notification to the control server 120 (S706), the unmanned aerial vehicle 110 may vertically fly to escape from the drop space 310 (S707).

Meanwhile, the control server 120 receiving the drop completion notification may transmit the drop permission to a next unmanned aerial vehicle (S708).

As described above, the upper space of the drop zone provided on the rooftop of the building and receiving the goods may be set as a standby space in which the unmanned aerial vehicle may wait and a drop space in which the goods may be dropped. if the drop permission is received from the delivery management server, the unmanned aerial vehicle 110 may enter the drop space from the standby space and drop the goods into the drop zone, thereby delivering the goods directly to the high location such as the rooftop of the high-rise building and preventing the collisions between the unmanned aerial vehicles.

Figure 8:
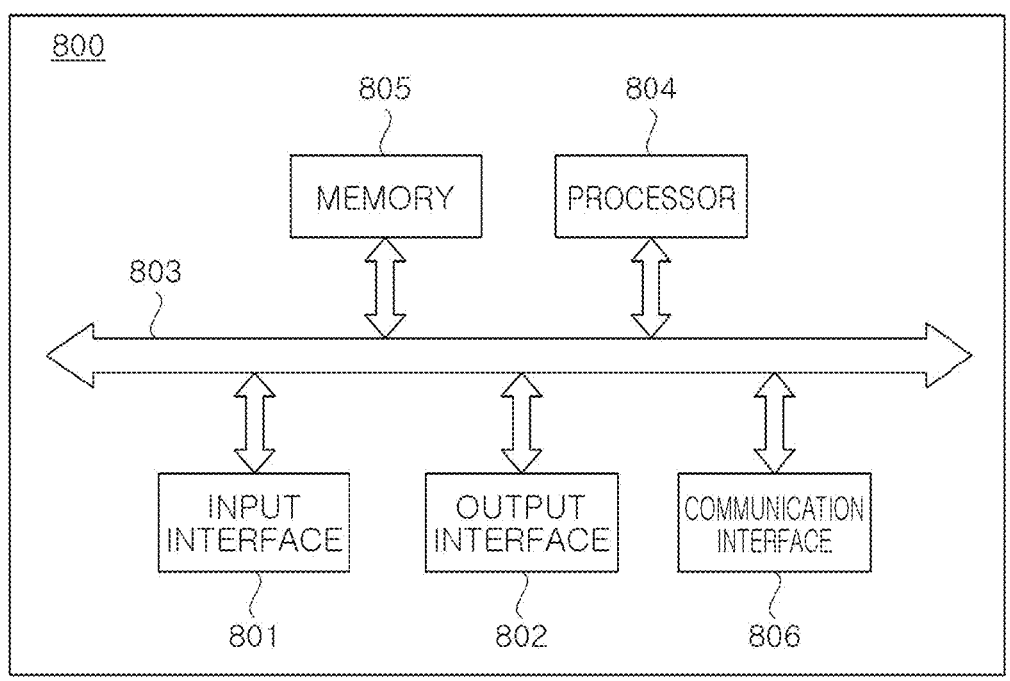
FIG. 8 is a block diagram of a computer device configured to entirely or partially implement an unmanned aerial vehicle or a control server.

Meanwhile, FIG. 8 is a block diagram of a computer device configured to entirely or partially implement an unmanned aerial vehicle or a control server, which may be applied to the unmanned aerial vehicle 110 and the control server 120 illustrated in FIG. 2.

As illustrated in FIG. 8, a computer device 800 includes an input interface 801, an output interface 802, a processor 804, a memory 805, and a communication interface 806, and the input interface 801, the output interface 802, the processor 804, the memory 805, and the communication interface 806 may be connected to each other through a bus 803.

The memory 805 may be used to store a program, a command, or a code, and the processor 804 may perform the program, the command, or the code stored in the memory 805, may control the input interface 801 to receive a signal, and may control the output interface 802 to transmit the signal. The memory 805 may include a read-only memory (ROM) and a random access memory (RAM), and may provide commands and data to the processor 804.

The processor 804 may be a central processing unit (CPU), and should be understood as being another general-purpose processor (DSP), a digital signal processor (DSP), an application specific integrated circuit (ASIC), a field programmable gate array (FPGA) or other programmable logic devices, an individual gate or transistor logic devices, and individual hardware components. The general-purpose processor may be a microprocessor, or the corresponding processor may be any conventional processor.

In an implementation process, a method performed in each device of FIG. 2 may be achieved by an integrated logic circuit of hardware or a software type command in the processor 804. The content of the method disclosed in relation to one or more example embodiments of the present disclosure may be implemented and completed by a hardware processor or may be implemented and completed by a combination of hardware and software modules of the processor. The software module may be placed in storage media such as a random access memory, a flash memory, a read-only memory, a programmable read-only memory, or an electrically erasable programmable memory, a registers, etc. The storage medium is disposed in the memory 805, and the processor 804 reads information from the memory 805 and combines the information with hardware to implement the content of the above-described method. To avoid duplication, a detailed description thereof will be omitted.

Meanwhile, in the present disclosure, "unit" may be implemented in various ways, such as a processor, program commands executed by the processor, a software module, a micro code, a computer program product, a logic circuit, an application-only integrated circuit, a firmware, etc., or may be implemented by hardware.

The present disclosure is not limited to the example embodiments described above and the accompanying drawings. The scope of rights of the present disclosure is intended to be limited by the appended claims. It will be understood by those skilled in the art that various substitutions, modification and changes in form and details may be made therein without departing from the spirit and scope of the present disclosure as defined by the appended claims.

What is claimed is:

1. An unmanned aerial vehicle for delivering goods using a drop zone, the unmanned aerial vehicle comprising:
    a drive configured to accelerate the unmanned aerial vehicle;
    a carrying part configured to carry goods;
    a communication interface;
    one or more processors; and
    memory storing instructions that, when executed by the one or more processors, cause the unmanned aerial vehicle to:
        identify a drop space and a standby space associated with the drop zone;
        enter, using the drive, the standby space associated with the drop zone;
        transmit, based on entering the standby space and via the communication interface, a drop permission request;
        based on receiving, via the communication interface, a drop permission, enter, using the drive, the drop space above the drop zone; and
        based on entering the drop space, drop the goods into the drop zone, without landing the unmanned aerial vehicle, by controlling the carrying part,
    wherein the drop zone has a funnel shape that forms a lower opening, an upper opening directly above the lower opening, and an inclined surface connecting the upper opening to the lower opening,
    wherein the drop space comprises a space extending, by a first length, upward from the upper opening of the drop zone, and excludes a space directly above the lower opening of the drop zone, and
    wherein the standby space comprises a space formed by extending, by a second length, from a side surface of the drop space to surround the side surface of the drop space.

2. The unmanned aerial vehicle of claim 1,
    wherein the inclined surface of the funnel shape corresponds to a slanted side surface of a conical frustum.

3. The unmanned aerial vehicle of claim 2, wherein the instructions, when executed by the one or more processors, cause the unmanned aerial vehicle to drop the goods from the drop space to a portion of the inclined surface,
    wherein the instructions, when executed by the one or more processors, cause the unmanned aerial vehicle to enter the drop space by entering an empty sub-space of the drop space, wherein a horizontal cross-section of the drop space corresponds to an annulus,
    wherein the drop space comprises a plurality of sub-spaces comprising the empty sub-space and a sub-space occupied by another unmanned aerial vehicle, and
    wherein after the goods are dropped to the inclined surface of the drop zone, the goods are moved to the lower opening by gravity on the inclined surface.

4. The unmanned aerial vehicle of claim 3, wherein the inclined surface has a spiral guide having a preset height formed thereon to reduce a moving speed of the dropped goods,
    wherein the spiral guide has a curved surface in contact with the goods.

5. The unmanned aerial vehicle of claim 2, wherein the instructions, when executed by the one or more processors, cause the unmanned aerial vehicle to:
    identify a plurality of sub-standby spaces of the standby space,
    wherein the standby space comprises:
        the plurality of sub-standby spaces, and
        a plurality of buffer spaces provided between each of the plurality of the sub-standby spaces to prevent collision between the unmanned aerial vehicle and an adjacent unmanned aerial vehicle.

6. The unmanned aerial vehicle of claim 5, wherein the instructions, when executed by the one or more processors, cause the unmanned aerial vehicle to enter the standby space by entering an empty sub-standby space, of the plurality of sub-standby spaces, having a maximum distance from the adjacent unmanned aerial vehicle.

7. The unmanned aerial vehicle of claim 5, wherein light emitting diodes (LEDs) of different colors are provided at an edge of the upper opening of the drop zone corresponding to the plurality of sub-standby spaces.

8. The unmanned aerial vehicle of claim 1, wherein the instructions, when executed by the one or more processors, cause the unmanned aerial vehicle to, based on completing dropping the goods into the drop zone, exit the drop space by flying up vertically without moving into the standby space.

9. The unmanned aerial vehicle of claim 1, wherein the instructions, when executed by the one or more processors, further cause the unmanned aerial vehicle to transmit, based on completing dropping the goods into the drop zone and via the communication interface, a drop completion notification.

10. The unmanned aerial vehicle of claim 1, wherein the instructions, when executed by the one or more processors, further cause the unmanned aerial vehicle to receive, via the communication interface, the drop permission after a previous unmanned aerial vehicle transmits a drop completion notification.

11. The unmanned aerial vehicle of claim 1, wherein the instructions that, when executed by the one or more processors, further cause the unmanned aerial vehicle to:
    transmit, before entering the standby space and via the communication interface, an emergency drop request; and
    based on receiving the drop permission, enter, using the drive, the drop space without waiting in the standby space.

12. The unmanned aerial vehicle of claim 11, wherein the instructions that, when executed by the one or more processors, cause the unmanned aerial vehicle to transmit the emergency drop request based on at least one of:
    a weight of the goods exceeding a threshold weight,
    a state of charge of a battery associated with the unmanned aerial vehicle being less than a threshold state of charge, or
    the goods comprising emergency goods.

13. A method comprising:
    identifying a drop space and a standby space associated with a drop zone;
    entering, by an unmanned aerial vehicle, the standby space associated with the drop zone;
    transmitting, based on entering the standby space, a drop permission request;
    based on receiving a drop permission, entering the drop space above the drop zone; and
    based on entering the drop space, dropping goods into the drop zone without landing the unmanned aerial vehicle, wherein the drop zone has a funnel shape that forms a lower opening, an upper opening directly above the lower opening, and an inclined surface connecting the upper opening to the lower opening, wherein the drop space comprises a space formed by extending, by a first length, upward from the upper opening of the drop zone, and excludes a space directly above the lower opening of the drop zone, and wherein the standby space comprises a space formed by extending, by a second length, from a side surface of the drop space to surround the side surface of the drop space.

14. The method of claim 13, wherein the inclined surface of the funnel shape corresponds to a slanted side surface of a conical frustum.

15. The method of claim 14, further comprising:
identifying a plurality of sub-standby spaces of the standby space,
wherein the standby space comprises:
the plurality of sub-standby spaces, and
a plurality of buffer spaces provided between each of the plurality of the sub-standby spaces to prevent collisions between the unmanned aerial vehicle and an adjacent unmanned aerial vehicle.

16. The method of claim 15, wherein the entering of the standby space comprises entering an empty sub-standby space, of the plurality of sub-standby spaces, having a maximum distance from the adjacent unmanned aerial vehicle.

17. The method of claim 13, further comprising, based on completing the dropping of the goods, exiting the drop space by flying up vertically without moving into the standby space,
wherein the entering the drop space comprises entering an empty sub-space of the drop space, wherein a horizontal cross-section of the drop space corresponds to an annulus, and
wherein the drop space comprises a plurality of sub-spaces comprising the empty sub-space and a sub-space occupied by another unmanned aerial vehicle.

18. The method of claim 13, further comprising transmitting, based on completing the dropping of the goods, a drop completion notification.

19. The method of claim 13, further comprising:
transmitting, before the entering of the standby space, an emergency drop request; and
based on the receiving of the drop permission, entering the drop space without waiting in the standby space.

20. An unmanned aerial vehicle for delivering goods using a drop zone, the unmanned aerial vehicle comprising:
a drive configured to accelerate the unmanned aerial vehicle;
a carrying part configured to carry goods;
a communication interface;
one or more processors; and
memory storing instructions that, when executed by the one or more processors, cause the unmanned aerial vehicle to:
transmit, before entering a standby space associated with the drop zone, an emergency drop request via the communication interface;
based on receiving a drop permission, identify, based on a shape of the drop zone, a drop space and the standby space and enter, using the drive, the drop space above the drop zone without waiting in the standby space; and
based on entering the drop space, drop the goods into the drop zone, without landing the unmanned aerial vehicle, by controlling the carrying part,
wherein the drop zone has a funnel shape that forms a lower opening, an upper opening directly above the lower opening, and an inclined surface connecting the upper opening to the lower opening,
wherein the drop space comprises a space extending, by a first length, upward from the upper opening of the drop zone, and excludes a space directly above the lower opening of the drop zone, and
wherein the standby space comprises a space formed by extending, by a second length, from a side surface of the drop space to surround the side surface of the drop space.

* * * * *